United States Patent [19]
Hasumi et al.

[11] Patent Number: 5,992,554
[45] Date of Patent: *Nov. 30, 1999

[54] RADIATOR COOLING FAN CONFIGURATION FOR MOTORCYCLES

[75] Inventors: Hiroaki Hasumi; Hirofumi Fukunaga, both of Wako, Japan

[73] Assignee: Honda Giken Kogyo Kabushiki Kaisha, Tokyo, Japan

[ * ] Notice: This patent is subject to a terminal disclaimer.

[21] Appl. No.: 08/812,134

[22] Filed: Mar. 5, 1997

[30] Foreign Application Priority Data

Mar. 5, 1996 [JP] Japan .................................. 8-047280

[51] Int. Cl.$^6$ ............................. B62D 61/02; F01P 3/20
[52] U.S. Cl. ..................................... 180/229; 123/41.51
[58] Field of Search ................................ 180/219, 229, 180/68.1, 68.4

[56] References Cited

U.S. PATENT DOCUMENTS 4,618,020   10/1986   Noda et al. ........................ 180/229
5,715,778   2/1998   Hasumi et al. ..................... 180/229

FOREIGN PATENT DOCUMENTS 62-41154   9/1987   Japan .

*Primary Examiner*—Lanna Mai
*Assistant Examiner*—Faye M. Fleming

[57] ABSTRACT

A cooling fan arrangement for a motorcycle having a radiator mounted on a left or right side of a water-cooled engine. The cooling fan is provided between the engine and the side-mounted radiator. The cooling fan arrangement efficiently cools the radiator by blasting cooling air from the engine side to radiator side without degrading the appearance of the motorcycle.

10 Claims, 2 Drawing Sheets

RADIATOR COOLING FAN CONFIGURATION FOR MOTORCYCLES

BACKGROUND OF THE INVENTION

1. Field of the Invention

This invention relates to a radiator cooling fan configuration structure for motorcycles. More particularly, this invention relates to a radiator cooling fan configuration for a motorcycle having at least one side-mounted radiator on the outside of a water-cooled engine.

2. Description of Background Art

In general, motorcycles having radiators on both right and left sides of an engine have been known heretofore as disclosed, for example, in Japanese Patent Publication No. Sho 62-41154 and corresponding U.S. Pat. No. 4,618,020. Conventionally, the above-mentioned motorcycles have been not provided with a fan for blasting cooling air through the left and right side radiators. Instead, such conventional motorcycles cool the side-mounted radiators by allowing wind to pass from the inside to outside of the radiator while the motorcycle moving. With this conventional design, however, the radiator is cooled insufficiently when the motorcycle is moving slowly or when the engine is idling and the motorcycle is stopped.

Conventional radiator cooling fans are arranged downstream of the radiator along the blasting direction of the cooling air. If such a conventional cooling fan arrangement is applied to a motorcycle having a radiator mounted on the side of the engine, the result would be a cooling fan provided on the outboard side of the radiator. Such an arrangement would degrade the appearance of the motorcycle.

SUMMARY AND OBJECTIONS OF THE INVENTION

The present invention is intended to resolve the above-noted problems with conventional cooling fan arrangements.

Therefore, it is an object of the present invention to provide a radiator cooling fan configuration for efficiently cooling a motorcycle radiator.

It is another object of the present invention to provide a cooling fan configuration which does not degrade the appearance of the motorcycle without degrading the motorcycle's appearance.

To achieve the above-mentioned objects, the present invention discloses a radiator cooling fan configuration structure for motorcycles having a radiator mounted on the side of a water-cooled engine, wherein a cooling fan is provided between the engine and the radiator and blasts cooling air from the engine side to the radiator side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
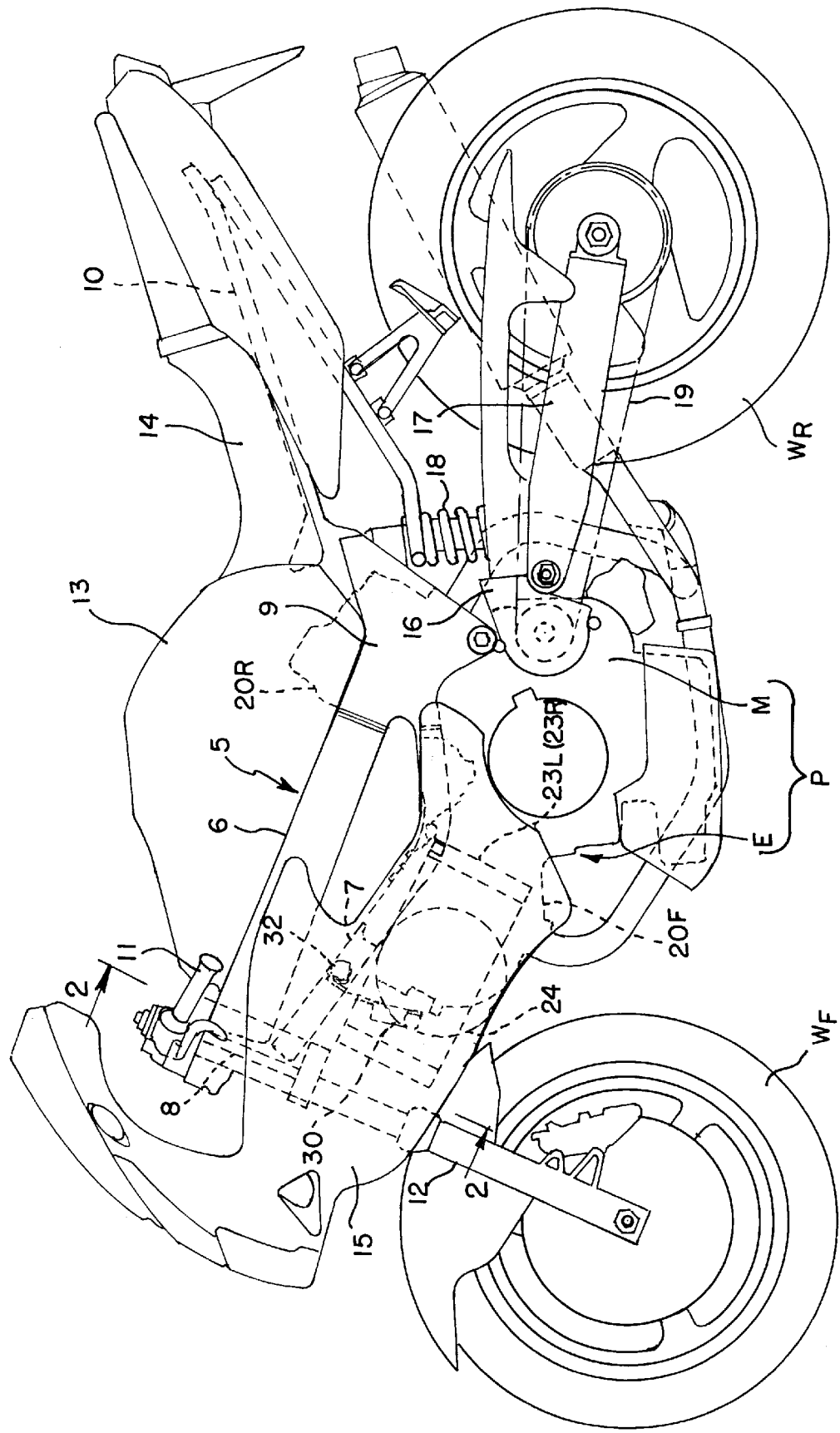
FIG. 1 is a side view of a motorcycle incorporating the inventive radiator cooling fan configuration.

In FIG. 1, the body frame 5 of the motorcycle includes a pair of main frames 6 extending in an upward and forward direction. The pair of main frames 6 widen as they extend upward by curving outwardly in right and left side directions of the motorcycle. The body frame 5 further includes a pair of auxiliary frames 7, under the main frames 6, extending upward and forward and which widen as they extend upward by curving outwardly in right and left directions.

A head pipe 8 commonly connects the front ends of both main frames 6 and both auxiliary frames 7. Furthermore, a pair of right and left connecting frames 9 connect the rear ends of the main frames 6 and auxiliary frame 7. A seat rail 10 extends backward and is connected to both connecting frames 9 at the front end thereof.

A front fork 12 is supported by the head pipe 8 which permits steering of the motorcycle in cooperation with the steering handle 11. A front wheel $W_F$ is supported at the bottom ends of the front fork 12. A fuel tank 13 is mounted on both main frames 6. Also, a seat 14 is fixed on the seat rail 10, and the front part of the body frame 5 is covered with a cowling 15.

A power unit P including an engine E and speed change gearing mechanism M connected to the engine E is mounted on the main frames 6 and auxiliary frames 7.

The rear wheel $W_R$ is supported at the rear ends of a rear fork 17 which, in turn, is swingably supported at the front end thereof by a bracket 16. Bracket 16 is provided on the speed change gearing mechanism M, and a cushion 18 is provided between the fork 17 and connecting frame 9. Power from the speed change gearing mechanism M is transmitted to the rear wheel $W_R$ through a endless chain 19.

Preferably, the engine E is a two cylinder water-cooled V-engine including a front engine bank $20_F$ having one cylinder and cylinder head in combination and a rear engine bank $20_R$ including the other cylinder and cylinder head. In combination, the front and rear engine banks $20_F$ and $20_R$ are provided in a substantially V-shaped configuration. The upper portion of the front engine bank $20_F$ is provided between both auxiliary frames 7 and the upper portion of the rear engine bank $20_R$ is provided between both connecting frames 9. Furthermore, front and rear engine banks $20_F$ and $20_R$ are supported by the main frames 6 and the auxiliary frames 7.

Figure 2:
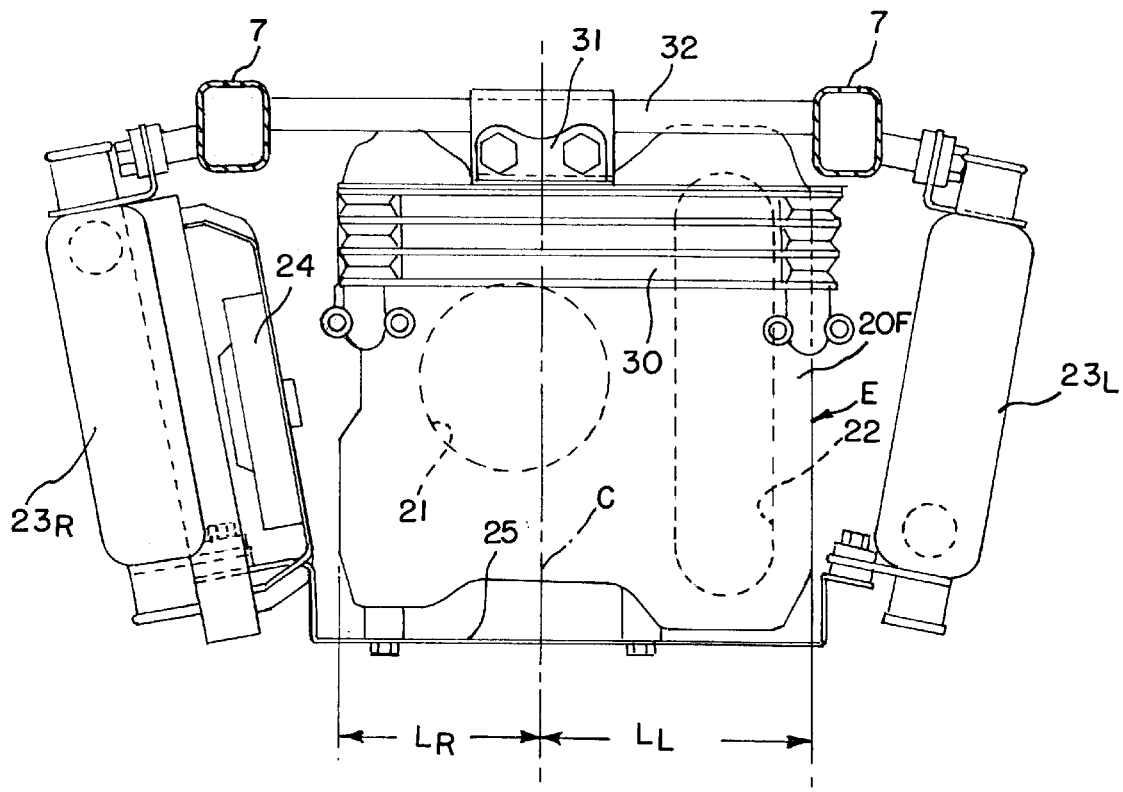
FIG. 2 is a cross-sectional view of a selected portion taken in the direction along cross section line 2—2 of FIG. 1.

Referring now to FIG. 2, both engine banks $20_F$ and $20_R$ have a cam chain chamber 22 on one side of the combustion chamber 21. The cam chain chamber 22 is provided on the left side (right side in FIG. 2) of the combustion chamber 21 from the perspective of a motorcycle driver and is supported by the main frames 6 and auxiliary frames 7.

The distance $L_R$ from the right end (left end in FIG. 2) of both engine banks $20_F$ and $20_R$ to the body center line C is smaller than the distance $L_L$ from the left end (right end in FIG. 2) of both engine banks $20_F$ and $20_R$ to the body center line C. In other words, both engine banks $20_F$ and $20_R$ are offset to the left relative to the body center line C.

Radiators $23_L$ and $23_R$, which may be constructed in a form of, eg. a flat rectangle, are provided on both sides of the front engine bank $20_F$ of the engine E. Also, the forward portions of the radiators ($23_L$ and $23_R$) project outward from the front end of the front engine bank $20_F$ as shown by the dotted lines in FIG. 1.

The radiators $23_L$ and $23_R$ are preferably inclined relative to the body center line C with a larger space between both radiators $23$ and $23_R$ at the top ends thereof than the space at the bottom ends thereof.

In other words, the radiators $23_L$ and $23_R$ are mounted on the auxiliary body frame 7 such that the radiators $23_L$ and $23_R$ are inclined relative to a center line C of the motorcycle with a larger inter-radiator space at the top ends thereof than the inter-radiator space at the bottom ends thereof. Furthermore, the radiators $23_L$ and $23_R$ are symmetrically mounted with respect to the body center line C.

Thus, the upper portions of these both radiators $23_L$ and $23_R$ are fixedly supported by both auxiliary frames 7 and 7, and the lower portions of these radiators $23_L$ and $23_R$ are fixedly supported by a support plate 25 which, in turn, is fixed to the bottom of the front engine bank $20_F$.

Because the front engine bank $20_F$ of the engine E is offset to the left side relative to the body center line C and both radiators $23_L$ and $23_R$ are symmetrically mounted relative to the body center line C on both sides of the front engine bank $20_F$, the space between the right radiator $23_R$ and the front engine bank $20_F$ is larger than the space between the left radiator $23_L$ and the front engine bank $20_R$. This invention utilizes this relatively larger space between the right radiator $23_R$ and the front engine bank $20_F$ by inserting a cooling fan 24 between the front engine bank $20_F$ of the engine E and the right radiator $23_R$.

The cooling fan 24 blasts cooling air from the front engine bank $20_F$ side to the right radiator $23_R$ side and is fixedly supported to the inboard side of the right radiator $23_R$. As further shown in FIGS. 1 and 2, the cooling fan 24 also forces air to flow laterally across the front engine bank $20_F$ and the oil cooler 30.

By providing the cooling fan 24 between the right radiator $23_R$ and the front engine bank $20_F$ cooling fan 24 is effectively hidden from view. In this way, the overall appearance of the motorcycle is not degraded by the cooling fan 24.

As further shown in FIG. 2, an air-cooled oil cooler 30 is provided between upper portions of both radiators $23_L$ and $23_R$ in front of the front engine bank $20_F$ of the engine E. The oil cooler 30 has a shape extending in the width (lateral) direction of the motorcycle in order to increase the surface area and, thereby, cooling efficiency.

To further increase the surface area and cooling efficiency, the oil cooler 30 is provided at the upper space that is provided between both radiators $23_L$ and $23_R$. In other words, the oil cooler 30 takes advantage of the relatively larger space that is provided between the upper portions of the radiators $23_L$ and $23_R$ by inclining the radiators relative to the center line C.

A support member 32 is provided between both auxiliary frames 7 of the body frame 5 above the oil cooler 30. A fixture 31 mounted at the top of the oil cooler 30 is fixedly supported by the supporting member 32.

The radiators $23_L$ and $23_R$, oil cooler 30, and cooling fan 24 are components of the cooling system for the motorcycle.

Figure 3:
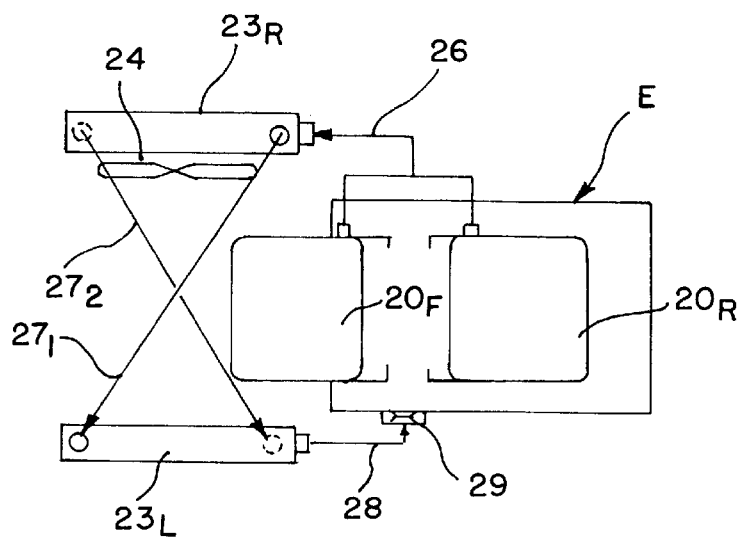
FIG. 3 is a diagram of liquid coolant circulation system for the radiators.

As shown in the coolant diagram of FIG. 3, both radiators $23_L$ and $23_R$ are connected to the engine E in parallel. Liquid coolant derived from both engine banks $20_F$ and $20_R$ of the engine E is guided to the rear of the right radiator $23_R$ through the common guide tube 26. The rear of the right radiator $23_R$ and the front of the left radiator $23_L$ are connected through a first guide tube $27_1$. A portion of liquid coolant introduced in the rear of the right radiator $23_R$ is guided to the front of the left radiator $23_L$ through the first guide tube $27_1$ without flowing in the right radiator $23_R$.

On the other hand, the residual portion of the liquid coolant introduced in the rear of the radiator $23_R$ flows into the right radiator $23_R$ and reaches the front of the radiator $23_R$, and is then guided to the rear of the left radiator $23_L$ through a second guide tube $27_2$ connected between the front of the right radiator $23_R$ and the rear of the left radiator $23_L$.

The liquid coolant introduced from the guide tube $27_1$ to the front of the left radiator $23_L$ flows in the radiator $23_L$ and reaches the rear of the left radiator $23_L$, and then returns to the engine E through the return guide tube 28 with the aid of a circulation pump 29 together with the liquid coolant which has been guided through the second guide tube $27_2$.

Next, the operation of the preferred embodiment is described. The cooling fan 24, located between the radiator $23_R$ on the right side of the front engine bank $20_F$ of the water-cooled engine E and the engine bank $20_F$, blasts cooling air from the front engine bank $20_F$ side to the radiator $23_R$ side. The cooling fan 24 also forces air to flow across the front engine bank $20_F$ and the oil cooler 30 thereby improving the cooling efficiency of those elements.

Although the cooling fan 24 is shielded from the outside by the radiator $23_R$, it can still effectively cool at least the radiator $23_R$, front engine bank $20_F$ and oil cooler 30. Accordingly, the radiator $23_R$ is efficiently cooled without degrading the appearance of the motorcycle.

This cooling effect is enjoyed even when the engine E is operated at low speeds or during idling. Also, because hot air is exhausted to the outside from the right radiator $23_R$, thermal damage to auxiliary apparati that are provided near the front engine bank $20_F$ of the engine E is effectively prevented.

This arrangement also has little or no effect on driveability of the motorcycle and actually increases rider comfort by more effectively cooling the motorcycle.

Because the radiators $23_L$ and $23_R$ are provided on both sides of the front engine bank $20_F$ of the water-cooled engine E and are inclined to provide a larger space between the top ends of these radiators $23_L$ and $23_R$ than the space between the bottom ends, the air-cooled oil cooler 30 can have a shape which extends relative to the width direction of the motorcycle. In this way, the oil cooler 30 can have increased surface area when compared with conventional oil coolers. Furthermore, this arrangement permits the oil cooler 30 to be efficiently cooled by cooling air generated by the cooling fan 24.

Still further, the inventive arrangement provides a relatively large empty space under the oil cooler 30 which permits increased air flow over the engine E and, thereby, more efficiently cools at least the front engine bank $20_F$ of the engine E.

Although this invention has been described in relation to a two cylinder engine, it is to be understood that the principles taught herein could be equally applied to four cylinder engine. Furthermore, the inventive arrangement could also be flipped such that the cooling fan is provided on the left side of the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A radiator cooling fan configuration for a motorcycle having a radiator mounted on a left or right side of a water-cooled engine, comprising:

a radiator mounted to a body frame on a left or right side of the motorcycle, a cooling fan mounted to said radiator between the engine and said radiator, said cooling fan blasting cooling air from an engine side of the motorcycle to a radiator side of the motorcycle.

2. A radiator cooling fan configuration for a motorcycle having a water cooled engine, comprising:

a first radiator mounted to a frame on a first side of the motorcycle, a cooling fan mounted to said first radiator between the engine and said first radiator, said cooling fan blasting cooling air from an engine side of the motorcycle to a first radiator side of the motorcycle.

3. The radiator cooling fan configuration according to claim 2, further comprising:

a second radiator mounted to the frame on a second side of the motorcycle.

4. The radiator configuration according to claim 3, wherein the engine is offset relative to the center line of the motorcycle towards said second radiator, said first and second radiators symmetrically mounted relative to the center line of the motorcycle, wherein the offset of the engine and the symmetrical mounting of said radiators creates a relative larger space between said first radiator and the engine, wherein said cooling fan is inserted in the relatively larger space between said first radiator and the engine.

5. The radiator cooling fan configuration according to claim 3, further comprising:

an oil cooler provided in front of the engine and between said first and second radiators, said cooling fan pulling cooling air across said oil cooler and blasting the cooling air through said first radiator.

6. The radiator cooling fan configuration according to claim 3, said first and second radiators inclined relative to a center line of the motorcycle such that an inter-radiator spacing is larger at an upper portion of said radiators than at a lower portion of said radiators.

7. The radiator cooling fan configuration according to claim 6, said oil cooler laterally extending across a width of the motorcycle in the larger inter-radiator spacing provided between the upper portion of said first and second radiators, wherein the lateral extent of said oil cooler permits said cooling fan to efficiently cool said oil cooler.

8. The radiator cooling fan configuration according to claim 3, wherein forward portions of said first and second radiators project forwardly from a front end of the engine.

9. The radiator cooling fan configuration according to claim 3, the frame of the motorcycle including a pair of main frames and a pair of first and second auxiliary frames said first radiator mounted to the first auxiliary frame, said second radiator mounted to the second auxiliary frame.

10. The radiator configuration according to claim 9, further comprising:

a support member connected to said first and second auxiliary frames, said oil cooler mounted to said support member.

* * * * *